United States Patent
Kasai et al.

(10) Patent No.: US 11,118,034 B2
(45) Date of Patent: Sep. 14, 2021

(54) TIRE

(71) Applicant: SUMITOMO RUBBER INDUSTRIES, LTD., Kobe (JP)

(72) Inventors: Yuki Kasai, Kobe (JP); Hirotoshi Otsuki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 35 days.

(21) Appl. No.: 16/473,583

(22) PCT Filed: Dec. 28, 2017

(86) PCT No.: PCT/JP2017/047237
§ 371 (c)(1),
(2) Date: Jun. 25, 2019

(87) PCT Pub. No.: WO2018/139165
PCT Pub. Date: Aug. 2, 2018

(65) Prior Publication Data
US 2020/0140661 A1 May 7, 2020

(30) Foreign Application Priority Data
Jan. 24, 2017 (JP) .............................. JP2017-010478

(51) Int. Cl.
*C08L 7/00* (2006.01)
*B60C 1/00* (2006.01)
*C08L 9/06* (2006.01)

(52) U.S. Cl.
CPC .............. *C08L 7/00* (2013.01); *B60C 1/0016* (2013.01); *C08L 9/06* (2013.01)

(58) Field of Classification Search
CPC ............. C08L 7/00; C08L 9/06; B60C 1/0016
USPC ......................................................... 524/528
See application file for complete search history.

(56) References Cited

U.S. PATENT DOCUMENTS

| | | | |
|---|---|---|---|
| 4,716,207 A | 12/1987 | Cozewith et al. | |
| 6,300,416 B1 | 10/2001 | Okada et al. | |
| 2002/0019484 A1 | 2/2002 | Nahmias et al. | |
| 2008/0033112 A1 | 2/2008 | Squire et al. | |
| 2012/0071605 A1 | 3/2012 | Baugh et al. | |
| 2012/0214933 A1* | 8/2012 | Lopez .................... | C08L 25/08 524/502 |
| 2013/0005781 A1 | 1/2013 | McCall et al. | |
| 2015/0202923 A1 | 7/2015 | Nakazono et al. | |

FOREIGN PATENT DOCUMENTS

| | | | |
|---|---|---|---|
| CN | 1216055 A | 5/1999 | |
| CN | 101501127 A | 8/2009 | |
| CN | 102803370 A | 11/2012 | |
| CN | 103568394 A | 2/2014 | |
| CN | 104507706 A | 4/2015 | |
| CN | 106084827 A | 11/2016 | |
| EP | 1816086 A1 * | 8/2007 | ............ C08L 53/025 |
| JP | S63-502286 A | 9/1988 | |
| JP | H08-134140 A | 5/1996 | |
| JP | H09-40809 A | 2/1997 | |
| JP | H10-265623 A | 10/1998 | |
| JP | 2012-6987 A | 1/2012 | |
| JP | 2012-531486 A | 12/2012 | |
| JP | 2014-030958 A | 2/2014 | |
| JP | 2014-031038 A | 2/2014 | |
| JP | 2014-218566 A | 11/2014 | |
| WO | WO 87/03603 A1 | 6/1987 | |
| WO | WO 2008/018952 A1 | 2/2008 | |

OTHER PUBLICATIONS

"Flow Polymers : Promix 400 Homogenizing Agent Applications in Tires and Automotive Extrusion", Flow Polymers, LLC, 2011, Cleveland, Ohio, USA, pp. 1-51. (Year: 2011).*
Flow Polymers, Inc., "Promix 400—Product Information", Mar. 10, 1998. (Year: 1998).*
Author unknown, "Flow Polymers: Promix® 400 with Naphtenic Oil for PAH Compliance", Flow Polymers, LLC, 2011, pp. 1-14 (14 pages).
Author unknown, "Flow Polymers: Promix® Homogenizing Agent Applications in Tires and Automotive Extrusion", Flow Polymers, LLC, 2011, Cleveland, Ohio, USA, XP055706833, pp. 1-51 (51 pages.).
European Office Action, dated Jul. 8, 2020, for European Application No. 17894567.1.
International Search Report for PCT/JP2017/047237 (PCT/ISA/210) dated Mar. 27, 2018, with English translation.
Written Opinion of the International Searching Authority for PCT/JP2017/047237 (PCT/ISA/237) dated Mar. 27, 2018.
Extended European Search Report for European Application No. 17894567.1, dated Nov. 29, 2019.
European Office Action dated Mar. 13, 2020, for European Application No. 17 894 567.1.
Flow Polymers, Inc, "Promix 400," Product Information, Mar. 10, 1998, 1 page.
Chinese Office Action and Search Report for Chinese Application No. 201780083857.6, dated Apr. 21, 2021, with an English translation.
Office Action issued in Japanese Patent Application No. 2018-517353 dated Aug. 3, 2021.

* cited by examiner

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

According to the tire of the present invention having a tread composed of a rubber composition comprising, based on 100 parts by mass of a rubber component, 1 to 20 parts by mass of an ethylene-propylene-styrene copolymer, wherein the composition ratio thereof is 10 to 60% by mass of ethylene, 10 to 60% by mass of propylene, and 5 to 40% by mass of styrene; and 3 to 100 parts by mass of carbon black, a tire having a tread composed of a rubber composition excellent in chipping resistance can be provided.

5 Claims, No Drawings

TIRE

TECHNICAL FIELD

The present invention relates to a tire having a tread composed of a rubber composition comprising a predetermined ethylene-propylene-styrene copolymer.

BACKGROUND OF THE INVENTION

Conventionally, for the purpose of improving the dispersibility of carbon black in a rubber component, the particle size and kneading method of carbon black have been studied. However, sufficient dispersibility has not been obtained and there is a need for improvement.

JP 2014-218566 A describes an ethylene-propylene-styrene copolymer as an example of a mixing resin to be blended as a processing aid. However, it does not consider the composition ratio of ethylene, propylene and styrene.

Also, a rubber composition for a tread that is a component of a tread of a tire is expected to be excellent in fuel efficiency, grip performance, steering stability, as well as chipping resistance (resistance at break).

SUMMARY OF THE INVENTION

The object of the present invention is to provide a tire having a tread composed of a rubber composition excellent in chipping resistance.

The present invention relates to a tire having a tread composed of a rubber composition comprising, based on 100 parts by mass of a rubber component, 1 to 20 parts by mass of an ethylene-propylene-styrene copolymer, wherein the composition ratio of the ethylene-propylene-styrene copolymer is 10 to 60% by mass of ethylene, 10 to 60% by mass of propylene, and 5 to 40% by mass of styrene; and 3 to 100 parts by mass of carbon black.

It is preferable that the rubber component comprises 5 to 70% by mass of a solution-polymerized styrene-butadiene rubber The tire of the present invention is a tire having a tread composed of a rubber composition excellent in chipping resistance.

DETAILED DESCRIPTION

The tire according to the present embodiment comprises a tread composed of a rubber composition comprising predetermined amounts of an ethylene-propylene-styrene copolymer and carbon black, wherein the composition ratio of the ethylene-propylene-styrene copolymer is 10 to 60% by mass of ethylene, 10 to 60% by mass of propylene, and 5 to 40% by mass of styrene.

The above-mentioned ethylene-propylene-styrene copolymer is a copolymer of ethylene, propylene and styrene that has the property that the ethylene phase and the propylene phase are compatible with the rubber component and the styrene phase is compatible with the carbon black; therefore, combination of the rubber component, said copolymer and the carbon black may improve the dispersibility of the carbon black in a rubber component.

The amount of ethylene in the ethylene-propylene-styrene copolymer is 10 to 60% by mass, more preferably 20 to 50% by mass, further preferably 30 to 40% by mass. When the amount of ethylene is less than 10% by mass, the fuel efficiency tends to be lowered. Also, when it is more than 60% by mass, the grip performance tends to be lowered.

The amount of propylene in the ethylene-propylene-styrene copolymer is 10 to 60% by mass, more preferably 20 to 50% by mass, further preferably 30 to 40% by mass. When the amount of propylene is less than 10% by mass, the grip performance tends to be lowered. Also, when it is more than 60% by mass, the fuel efficiency tends to be lowered.

The amount of styrene in the ethylene-propylene-styrene copolymer is 5 to 40% by mass, more preferably 5 to 25% by mass, further preferably 10 to 20% by mass. When the amount of styrene is less than 5% by mass, the chipping resistance tends to be lowered. Also, when it is more than 40% by mass, the fuel efficiency tends to be lowered.

One example of such ethylene-propylene-styrene copolymer is Promix 400 manufactured by Flow Polymers Inc.

The content of ethylene-propylene-styrene copolymer is, based on 100 parts by mass of the rubber component, 1 parts by mass or more, more preferably 2 parts by mass or more, further preferably 3 parts by mass or more. When the content of the ethylene-propylene-styrene copolymer is less than 1 parts by mass, the chipping resistance tends to be lowered. Also, the content of the ethylene-propylene-styrene copolymer is 20 parts by mass or less, more preferably 10 parts by mass or less, further preferably 5 parts by mass or less. When the content of the ethylene-propylene-styrene copolymer is more than 20 parts by mass, the fuel efficiency tends to be lowered.

The rubber component is not particularly limited, and a rubber component used for a rubber composition for a tread of conventional tires may be used. Examples thereof include diene rubbers such as isoprene rubber including natural rubber and polyisoprene rubber (IR), a butadiene rubber (BR), a styrene-butadiene rubber (SBR), a styrene-isoprene-butadiene copolymer (SIBR), a chloroprene rubber (CR), an acrylonitrile-butadiene rubber (NBR), and butyl rubbers. These rubber components may be used alone or may be used in combination of two or more thereof. Particularly, it is preferable that the rubber component comprises an isoprene rubber, SBR and BR from the viewpoint of a balance of fuel efficiency, abrasion resistance, durability and wet grip performance, and it is also preferable that it comprises an isoprene rubber and SBR because they provide particularly excellent chipping resistance.

Examples of the natural rubber includes a natural rubber (NR), and a modified natural rubber such as an epoxidized natural rubber (ENR), a hydrogenated natural rubber (HNR), a deproteinized natural rubber (DPNR), a high purity natural rubber (UPNR) and the like.

When an isoprene rubber is comprised, the content thereof in the rubber component is, from the viewpoint of appearance performance, preferably 30% by mass or more, more preferably 50% by mass or more, further preferably 70% by mass or more. Also, the content of an isoprene rubber is, from the viewpoint of chipping resistance, preferably 90% by mass or less, more preferably 85% by mass or less, further preferably 80% by mass or less.

Examples of the SBR include an unmodified solution-polymerized SBR (S-SBR), an unmodified emulsion-polymerized SBR (E-SBR), and a modified SBR (modified S-SBR, modified E-SBR) of those. Examples of the modified SBR include an terminal-modified and/or main-chain-modified SBR, a modified SBR coupled with tin or a silicon compound (a condensate, one having a branched structure and the like). Among those, S—SBR is preferable because that provides excellent fuel efficiency.

The styrene content of the SBR is, from the viewpoint of grip performance and rubber strength, preferably 5% by mass or more, more preferably 10% by mass or more, further preferably 20% by mass or more. Also, the styrene content of the SBR is, from the viewpoint of fuel efficiency, preferably 60% by mass or less, more preferably 50% by mass or less, further preferably 40% by mass or less. It is noted that the styrene content of the SBR as used herein is calculated in accordance with $^1$H-NMR measurement.

When SBR is comprised, the content thereof in the rubber component is, from the viewpoint of chipping resistance, preferably 5% by mass or more, more preferably 10% by mass or more, more preferably 15% by mass or more, further preferably 25% by mass or more. Also, the content of the SBR is, from the viewpoint of abrasion resistance, preferably 70% by mass or less, more preferably 55% by mass or less, more preferably 40% by mass or less, more preferably 35% by mass or less, further preferably 30% by mass or less.

Examples of the BR include a high cis BR having a cis content of 90% or more, an terminal-modified and/or mainchain-modified SBR, a modified SBR coupled with tin or a silicon compound (a condensate, one having a branched structure and the like). Among those BR, a high cis BR is preferable because that provides excellent abrasion resistance.

When BR is comprised, the content thereof in the rubber component is, from the viewpoint of abrasion resistance, preferably 1% by mass or more, more preferably 5% by mass or more, further preferably 10% by mass or more. Also, the content of the BR is, from the viewpoint of workability, preferably 80% by mass or less, more preferably 75% by mass or less, further preferably 70% by mass or less.

The carbon black is not particularly limited, and can be one commonly used in the tire industry such as GPF, FEF, HAF, ISAF, and SAF. These can be used alone or can be used in combination of two or more thereof.

The nitrogen adsorption specific surface area ($N_2SA$) of the carbon black is, from the viewpoint of weather resistance and reinforcing property, preferably 80 $m^2/g$ or more, more preferably 90 $m^2/g$ or more. Also, the $N_2SA$ of the carbon black is, from the viewpoint of fuel efficiency, dispersibility, fracture characteristics and durability, preferably 400 $m^2/g$ or less, more preferably 300 $m^2/g$ or less, more preferably 250 $m^2/g$ or less, more preferably 200 $m^2/g$ or less, further preferably 150 $m^2/g$ or less. It is noted that t the $N_2SA$ of the carbon black as used herein is measured according to JIS K 6217 Method A.

The dibutyl phthalate oil absorption (DBP) of the carbon black is, from the viewpoint of reinforcing property and durability, preferably 60 ml/100 g or more, more preferably 80 ml/100 g or more. Also, the DBP oil absorption of the carbon black is, from the viewpoint of durability and fatigue resistance, preferably 300 ml/100 g or less, more preferably 200 ml/100 g or less, further preferably 150 ml/100 g or less.

When carbon black is comprised, the content thereof based on 100 parts by mass of the rubber component is preferably 3 parts by mass or more, more preferably 5 parts by mass or more because that allows the present invention to be more effective. Also, the content of the carbon black is, from the viewpoint of fuel efficiency and workability, preferably 100 parts by mass or less, more preferably 80 parts by mass or less, further preferably 60 parts by mass or less.

In the rubber composition according to the present embodiment, in addition to the above-mentioned ethylene-propylene-styrene copolymer, rubber component and carbon black, compounding agents generally used in the production of a rubber composition can be suitably comprised, for example, a reinforcing filler other than carbon black, such as silica, calcium carbonate, clay, a coupling agent, zinc oxide, stearic acid, various antioxidants, a softening agent, a wax, a vulcanizing agent such as sulfur, various vulcanization accelerators.

For the vulcanizing agent, a known vulcanizing agent, e.g. sulfur, an organic peroxide, a resin vulcanizing agent, a metallic oxide such as magnesium oxide is used. Those vulcanizing agents can be used alone, or the two or more can be used in combination.

For the vulcanization accelerator, a known vulcanization auxiliary, e.g. sulfenamides, aldehydes, ammonium, amines, guanidines, thioureas, thiazoles, thiurams, dithiocarbamates, xanthates are used. Those vulcanization accelerators can be used alone, or the two or more can be used in combination. Among those, in the present embodiment a sulfenamide vulcanization accelerator can be used suitably.

Examples of the sulfenamide vulcanization accelerator include, for example, N-tert-butyl-2-benzothiazolylsulfenamide (TBBS), N-cyclohexyl-2-benzothiazolylsulfenamide (CBS), N, N-dicyclohexyl-2-benzothiazolesulfenamide (DCBS). Among those, N-tert-butyl-2-benzothiazolylsulfenamide is preferable.

Examples of the antioxidant, an amine-ketone-based antioxidant, an imidazole-based antioxidant, an amine-based antioxidant, a phenolic-based antioxidant, a sulfur-based antioxidant, a phosphorus-based antioxidant. Those antioxidants can be used alone, or the two or more can be used in combination.

The rubber composition can be prepared by a usual method. The rubber composition can be prepared, for example, by kneading the above-mentioned components except the vulcanizing agent and the vulcanization accelerator with a known kneading apparatus usually used in the rubber industry such as a Banbury mixer, a kneader or an open roll and then adding the vulcanizing agent and the vulcanization accelerator, followed by further kneading of the mixture and then carrying out vulcanization.

The rubber composition according to the present embodiment is preferably used for a tread of tire because that provides excellent chipping resistance.

A tire comprising the rubber composition according to the present embodiment can be manufactured by a usual method with the above-mentioned rubber composition. Specifically, the tire can be produced by subjecting the rubber composition prepared by compounding the above-mentioned compounding agents with the rubber component according to necessity, to extrusion processing to a shape of a tread or the like, and then laminating together with other tire members on a tire building machine and forming by a usual forming method, thus forming an unvulcanized tire, and heating and compressing this unvulcanized tire in a vulcanizer.

Preferred embodiments of the present invention are as follows.

[1] A tire having a tread composed of a rubber composition comprising, based on 100 parts by mass of a rubber component, 1 to 20 parts by mass, preferably 2 to 10 parts by mass, more preferably 3 to 5 parts by mass of an ethylene-propylene-styrene copolymer, wherein the composition ratio thereof is 10 to 60% by mass, preferably 20 to 50% by mass, more preferably 30 to 40% by mass of ethylene, 10 to 60% by mass, preferably 20 to 50% by mass, more preferably 30 to 40% by mass of propylene, and 5 to 40% by mass, preferably 5 to 25% by mass, more preferably 10 to 20% by mass of styrene; and 3 to 100 parts by mass, preferably 3 to 80 parts by mass, more preferably 5 to 80 parts by mass, more preferably 5 to 60 parts by mass of carbon black.

[2] The tire according to [1], wherein the rubber component comprises 5 to 70% by mass, preferably 5 to 55% by mass, more preferably 10 to 55% by mass, more preferably 10 to 40% by mass, more preferably 15 to 35% by mass, further preferably 25 to 30% by mass of a solution-polymerized styrene-butadiene rubber.

EXAMPLE

The present invention will be described based on Examples, however the present invention is not limited thereto only.

A variety of chemicals used in Examples and Comparative Examples are explained below.

NR: TSR20
SBR: S-SBR (a modified S-SBR with an activated carbon terminal, styrene content: 10% by mass) manufactured by JSR Corporation
Carbon black: DIABLACK I manufactured by Mitsubishi Chemical Corporation ($N_2SA$: 114 $m^2/g$, DBP oil absorption: 114 ml/100 g)
Copolymer 1: Promix 400 manufactured by Flow Polymers Inc.
Copolymer 2: STRUKTOL 40 MS manufactured by Struktol GmbH
Copolymer 3: Rhenosin 145 A/P manufactured by Rhein Chemie Corp.
Wax: Ozoace-0355 manufactured by NIPPON SEIRO CO., LTD.

Antioxidant: NOCRAC 224 (TMQ, 2,2,4-trimethyl-1,2-dihydroquinoline polymer) manufactured by Ouchi Shinko Chemical Industrial Co., Ltd.
Stearic acid: a stearic acid manufactured by NOF CORPORATION, KAO CORPORATION, and the like
Zinc oxide: Class 2 zinc oxide manufactured by MITSUI MINING 86 SMELTING CO., LTD
Sulfur: Seimi sulfur (oil content: 10%) manufactured by NIPPON KANRYU INDUSTRY CO., LTD.
Vulcanization accelerator: Nocceler NS-G (TBBS, N-tert-butyl-2-benzothiazolylsulfenamide) manufactured by OUCHI SHINKO CHEMICAL INDUSTRIAL CO., LTD.

Examples and Comparative Examples

According to the compounding formulations shown in Table 1 below, all chemicals, other than sulfur and a vulcanization accelerator, were kneaded using a 1.7 L sealed Banbury mixer for five minutes up to a discharge temperature of 170° C. to obtain a kneaded product. Then, the obtained kneaded product was kneaded again (remilled) at a discharge temperature of 150° C. for four minutes by the Banbury mixer. Then, sulfur and a vulcanization accelerator were added to the obtained kneaded product, and kneaded for four minutes up to 105° C. using a biaxial open roll to obtain an unvulcanized rubber composition. The obtained unvulcanized rubber composition was subjected to press-vulcanization at 170° C. for 12 minutes to obtain a test rubber composition. The following evaluations were made using the obtained test rubber composition. The results are shown in Table 1.

Strength at Break

A No. 3 dumbbell type test piece composed of each vulcanized rubber composition was subjected to a tensile test under a 23° C. atmosphere, according to JIS K6251 "Vulcanized Rubber and Thermoplastic Rubber—Method of Obtaining Tensile Characteristics", to measure the strength at break (TB) (MPa). A higher strength at break represents better chipping resistance.

TABLE 1

| | Example | | | | | Comparative Example | | | |
|---|---|---|---|---|---|---|---|---|---|
| | 1 | 2 | 3 | 4 | 5 | 1 | 2 | 3 | 4 |
| Blending amount (parts by mass) | | | | | | | | | |
| NR | 72 | 72 | 72 | 50 | 30 | 72 | 72 | 72 | 72 |
| SBR | 28 | 28 | 28 | 50 | 70 | 28 | 28 | 28 | 28 |
| Carbo black | 45 | 45 | 45 | 45 | 45 | 45 | 45 | 45 | 45 |
| Copolymer 1 | 3.12 | 2.00 | 4.50 | 3.12 | 3.12 | — | — | — | — |
| Copolymer 2 | — | — | — | — | — | 3.12 | — | 2.00 | — |
| Copolymer 3 | — | — | — | — | — | — | 3.12 | — | 2.00 |
| Wax | 1.5 | 1.5 | 1.5 | 1.5 | 1.5 | 1.5 | 1.5 | 1.5 | 1.5 |
| Antioxidant | 2 | 2 | 2 | 2 | 2 | 2 | 2 | 2 | 2 |
| Stearic acid | 2 | 2 | 2 | 2 | 2 | 2 | 2 | 2 | 2 |
| Zinc oxide | 2.85 | 2.85 | 2.85 | 2.85 | 2.85 | 2.85 | 2.85 | 2.85 | 2.85 |
| Sulfur | 1.37 | 1.37 | 1.37 | 1.37 | 1.37 | 1.37 | 1.37 | 1.37 | 1.37 |
| Vulcanization accelerator | 1 | 1 | 1 | 1 | 1 | 1 | 1 | 1 | 1 |
| Evaluation | | | | | | | | | |
| Strength at break | 130 | 120 | 120 | 120 | 110 | 90 | 90 | 80 | 80 |

The results in Table 1 show that a rubber composition comprising predetermined amounts of a predetermined ethylene-propylene-styrene copolymer and carbon black is excellent in chipping resistance, and the tire of the present embodiment is a tire having a tread composed of a rubber composition excellent in chipping resistance.

The invention claimed is:
1. A tire having a tread composed of a rubber composition comprising, based on 100 parts by mass of a rubber component,
1 to 20 parts by mass of an ethylene-propylene-styrene copolymer, wherein the composition ratio thereof is 10 to 60% by mass of ethylene, 10 to 60% by mass of propylene, and 5 to 40% by mass of styrene, and wherein the content of ethylene-propylene-styrene copolymer is, based on 100 parts by mass of the rubber component, 10 parts by mass or less;

3 to 60 parts by mass of carbon black; and a vulcanization accelerator that comprises N-tert-butyl-2-benzothiazolylsulfenamide.

2. The tire of claim 1, wherein the amount of styrene in the ethylene-propylene-styrene copolymer is 5 to 25% by mass.

3. The tire of claim 1, wherein the rubber component comprises 5 to 70% by mass of a solution-polymerized styrene-butadiene rubber.

4. A tire having a tread composed of a rubber composition comprising, based on 100 parts by mass of a rubber component, 1 to 20 parts by mass of an ethylene-propylene-styrene copolymer, wherein the composition ratio thereof is 10 to 60% by mass of ethylene, 10 to 60% by mass of propylene, and 5 to 40% by mass of styrene;

3 to 60 parts by mass of carbon black; and a vulcanization accelerator that comprises N-tert-butyl-2-benzothiazolylsulfenamide, wherein the rubber component comprises, based on 100 parts by mass of the rubber component, 70 parts by mass or more of natural rubber and 25 parts by mass or more of a solution-polymerized styrene-butadiene rubber.

5. A tire having a tread composed of a rubber composition comprising, based on 100 parts by mass of a rubber component, 1 to 20 parts by mass of an ethylene-propylene-styrene copolymer, wherein the composition ratio thereof is 10 to 60% by mass of ethylene, 10 to 60% by mass of propylene, and 5 to 40% by mass of styrene;

3 to 60 parts by mass of carbon black; and a vulcanization accelerator that comprises N-tert-butyl-2-benzothiazolylsulfenamide, wherein the rubber component does not contain a butadiene rubber.

* * * * *